United States Patent
Gundy et al.

(10) Patent No.: US 6,398,634 B1
(45) Date of Patent: Jun. 4, 2002

(54) HOLE ROUGHENING DEVICE AND METHOD

(75) Inventors: William P. Gundy, P.O. Box 15, Milford, NH (US) 03055; Ernst Geiger, Russell, NY (US)

(73) Assignee: William P. Gundy, Milford, NH (US)

( * ) Notice: Subject to any disclaimer, the term of this patent is extended or adjusted under 35 U.S.C. 154(b) by 0 days.

(21) Appl. No.: 09/658,836

(22) Filed: Sep. 8, 2000

(51) Int. Cl.[7] .............................................. B23F 21/03
(52) U.S. Cl. ...................................... 451/547; 451/541
(58) Field of Search ................................ 451/540, 541, 451/544, 546, 547; 175/396, 415, 412, 426, 428; 407/56

(56) References Cited

U.S. PATENT DOCUMENTS

| | | | |
|---|---|---|---|
| 2,797,535 A | * 7/1957 | Atkinson | ................... 51/184.1 |
| 3,815,694 A | 6/1974 | Giustino | |
| 3,848,687 A | * 11/1974 | Funakubo | ................... 175/394 |
| 4,143,723 A | 3/1979 | Schmotzer | |
| 4,446,934 A | 5/1984 | Muller | |
| 4,979,851 A | 12/1990 | Hunt | |
| 5,466,099 A | 11/1995 | Sullivan et al. | |
| 5,666,779 A | 9/1997 | Fuchs et al. | |
| 5,725,416 A | * 3/1998 | Russell | ......................... 451/54 |
| 6,213,860 B1 | * 4/2001 | Tunstall et al. | ............. 451/451 |

* cited by examiner

Primary Examiner—Timothy V. Eley
Assistant Examiner—Dung Van Nguyen
(74) Attorney, Agent, or Firm—Bourque & Associates, P.A.

(57) ABSTRACT

The present invention comprises a drilling tool for attachment to conventional drilling means, which roughens the internal surface of a pre-drilled hole to enhance attachment of an anchoring device and adhesive placed therein.

The roughening device has a shaft for attaching to a conventional drilling device at one end and a tubular side wall bearing cutters/abraders at the other. There is a void between the shaft and the side wall which is filled by an elastomeric material which cushions the action of the cutters/abraders.

5 Claims, 1 Drawing Sheet

HOLE ROUGHENING DEVICE AND METHOD

FIELD OF THE INVENTION

The present invention relates generally to a device to improve the installation of anchoring devices utilizing adhesives in concrete and more specifically, to a device to roughen cored holes.

BACKGROUND OF THE INVENTION

Numerous systems are known for attaching a structural member to a concrete substrate by means of an anchoring device secured by adhesive in a drilled hole. Drilling tools for making the initial hole in the concrete suffer from several disadvantages.

Carbide drill bits produce rough walled holes which maximize the attachment of the adhesive of the anchoring device within the drilled hole. Unfortunately, carbide drilled bits are subject to wear and have short usable lives.

Diamond drills, on the other hand, have enhanced wear properties. Unfortunately, diamond drills produce smooth drill holes. The resulting holding power of an adhesive in a diamond drilled hole is up to 100 percent less than the holding power of the same adhesive in a carbide drilled hole.

SUMMARY OF THE INVENTION

The present invention comprises a drilling tool for attachment to conventional drilling means, which roughens the internal surface of a pre-drilled hole to enhance attachment of an anchoring device and adhesive placed therein.

The roughening device of the present invention is tubular in shape. One end comprises a shaft for attaching to a spindle which connects a conventional drilling device, such as a hand drill, to the roughening device. The other end of the shaft is surrounded by a tubular side wall. There is a void between the shaft and the side wall which is filled by an elastomeric material. The tubular side wall is pierced by holes through which pass cutters or abraders. These cutters or abraders are positioned through the tubular side walls with the cutting or abrading end of each cutter/abrader facing the exterior surface of the tubular side wall and the opposite non-cutting end of the cutter/abrader proximate or embedded in the elastomeric material.

The roughening device of the present invention is inexpensive and provides extremely rapid roughening of the existing hole. The placement of the elastomer between the shaft and the tubular side wall results in cushioning of the device and the cutters/abraders against shock and also allows the cutters/abraders to automatically somewhat adjust for varying tolerances within the hole. In addition, as a result of the cushioning effect of the elastomer, the cutter/abrader has a longer usable life expectancy.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
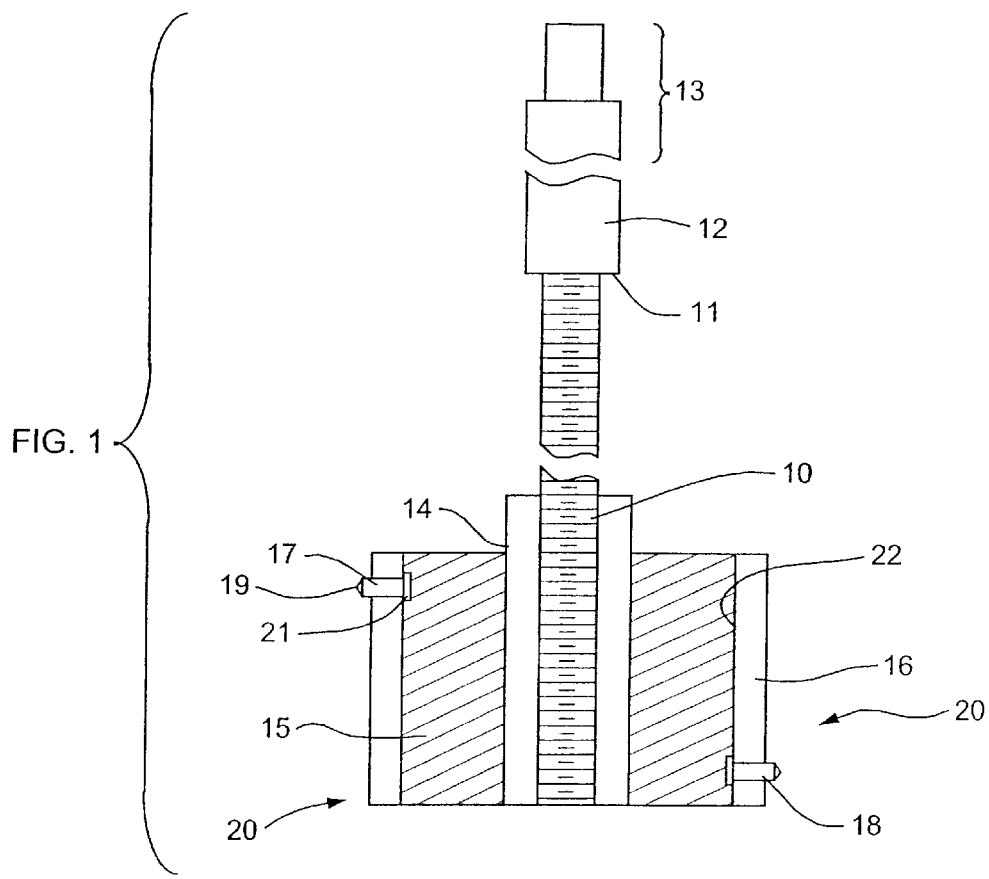
FIG. 1 is a cross-sectional side view of the roughening device of the present invention.
Figure 2:
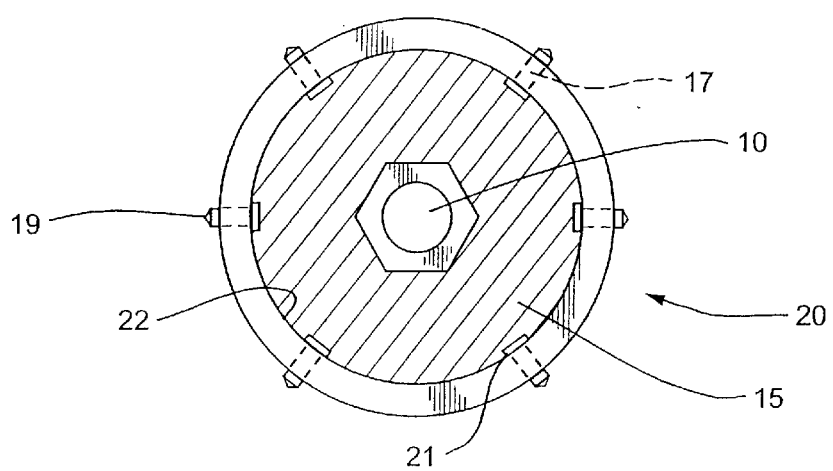
FIG. 2 is a top cross-sectional view of the roughening device of the present invention.

Referring to the figures and, in particular, to FIG. 1, the roughening device of the present invention comprises a shaft 10, with proximal end 11 for attaching to a spindle 12. The spindle 12 connects to a conventional drilling device 13, such as a hand drill.

The distal end 14 of the shaft 10 is surrounded by an elastomeric material 15 which fills a void between the shaft 10 and the interior surface 22 of the tubular side wall 16. The tubular side wall 16 is pierced by a number of holes 17 through each of which passes a cutter/abrader 18. Each cutter/abrader 18 is positioned through the tubular side wall 16 with the cutting end 19 of the cutter/abrader 18 facing the exterior surface 20 of the tubular side wall 16 and the opposite non-cutting end 21 of the cutter/abrader 18 facing the interior surface 22 of the tubular side wall 16, proximate or embedded in the elastomeric material 15. The number of cutters/abraders and their placement (i.e., rows or staggered arrangement) is not a limitation of the present invention, but is within the determination of someone skilled in the art.

In the preferred embodiment, the cutters/abraders are arranged in two rows, each row comprising three cutters/abraders spaced 120° apart.

The approximate diameter of the tubular side wall in the exemplary embodiment is 2" for a 2" hole. The cutters/abraders extend 0.050" beyond the exterior surface of the tubular side wall, as illustrated in FIG. 1. Exemplary cutters/abraders include tire stud inserts which are readily available and are mounted through holes in the tubular side wall.

The elastomeric material may comprise any typical elastomeric material such as, but not limited to, polyurethane, and natural or synthetic rubbers. The elastomeric material positioned in the void between the shaft and the tubular side wall allows the cutters/abraders to move in and out against the surface to be roughened. This compensates for varying hole diameter and cushions the cutters/abraders, giving a longer life.

To use the roughening device of the present invention, the roughening device, attached to a drilling device, is passed one or two times in and out of a pre-drilled hole. An adhesive material and an anchoring device are inserted into the now roughened drilled hole in a manner well known in the prior art.

Modifications and substitutions by one of ordinary skill in the art are considered to be within the scope of the present invention which is not to be limited except by the claims which follow.

What is claimed is:

1. A roughening device comprising:
    a shaft, having a proximal end and a distal end, said proximal end attached to a spindle for connecting to a drilling means;
    an elastomeric material, surrounding said distal end of said shaft;
    a tubular side wall surrounding said elastomeric material, said tubular side wall having an interior surface and an exterior surface, said elastomeric material filling a void between said shaft and said interior surface of said tubular side wall, said tubular side wall pierced by
    a plurality of holes through which passes
    a corresponding cutter/abrader, said cutter/abrader having a cutting end, an opposing non-cutting end, said cutting end extending beyond said exterior surface of said tubular side wall and said opposing non-cutting end proximate said elastomeric material.

2. The roughening device of claim 1, wherein said conventional drilling means is a hand drill.

3. The roughening device of claim 1 wherein said cutter/abrader is a carbide cutter/abrader.

4. The roughening device of claim 3 wherein said carbide cutter/abrader is a tire stud insert.

5. The roughening device of claim 1, wherein said opposing non-cutting end of said cutter/abrader is embedded in said elastomeric material.

* * * * *